United States Patent Office 3,474,066
Patented Oct. 21, 1969

3,474,066
POLYMERIZABLE COMPOSITIONS AND PROCESS
OF PRODUCING SAME
Augustus B. Small and John J. Jaruzelski, Westfield, and
Leandros P. Lenas, Elizabeth, N.J., assignors to Esso
Research and Engineering Company, a corporation of
Delaware
No Drawing. Filed Dec. 31, 1963, Ser. No. 334,939
Int. Cl. C08g 19/12, 1/60, 1/62
U.S. Cl. 260—40
32 Claims

ABSTRACT OF THE DISCLOSURE

Monomeric mononuclear, monovinyl aromatic compounds are cured at room temperature without the application of external heat by the use of a mixture of peroxides showing synergistic activity, the peroxide mixture comprising at least one ketone-aldehyde type peroxide and at least two acyl peroxides in conjunction with a monomeric drier such as metal naphthenates or cobalt complexes of an alkyl acetyl acetate and a tertiary amine.

---

This invention relates to polymerizable compositions of matter and other polymerized compositions which have been cured at ambient temperatures. The invention also relates to the novel process of preparing the polymerizable compositions, to the process of compounding said compositions and to the process of curing said compositions at ambient temperatures and without the application of external heating.

Resins and resinifiable mixes from which resins are produced customarily require the application of external heat once they are admixed in order to form the same into hard, thermosetting compositions of matter. Usually such compositions, by reason of the necessity for the application of external heat, require the use of expensive machinery, heaters, ovens, molds, and the like in order to achieve commercial production of useful articles. Structural reinforcing elements are oftentimes employed in the mixes prior to final curing. The plastics and resin industries have sought for a considerable period of time to compound various resinous mixes which are suitable and readily adaptable to the hand lay-up methods of impregnation and forming structural and other useful articles and shapes. What is needed to advance the technology in the industry is to be able to avoid the necessity of imposed pressures and high temperatures, i.e., to be able to cure at room temperature in relatively short periods of time to give a hard material having good tensile and flexural strengths and having relatively high resistance to impact. In the fabrication and working up of resinous mixes, they should be readily wettable or spread over the surface of the reinforcing elements such as, for example, glass fibers, finely divided silica filler and the usual fibers and filler materials employed as reinforcing elements, yet have a sufficiently high viscosity to resist appreciable run-off during lay-up procedures. At the same time the resinifiable mixes should have a sufficiently long pot life, i.e., before setting up, to be readily stored and handled in the liquid condition.

The present invention is directed to the production of resinifiable, normally liquid, polymerizable compositions which can be readily cured at ambient temperatures and do not require the necessity of external heat means and pressure to accomplish a final desired cured resinous composition having high tensile, flexural and impact strengths, when reinforced with fibers or finely divided impregnating or filler materials.

In order to achieve such a composition, the present invention deals with the compounding of monomeric polymerizable monovinyl aromatic compounds, which constitute a major component of the system, with which is admixed relatively small or minor amounts of a polymerizable monomeric polyolefinic crosslinking agent. In the past such conventional admixtures have been cured conventionally through the use of the so-called free radical type catalysts. These have been, for the most part, the conventional peroxide type catalysts. In the instant novel compositions, a plurality of at least three such peroxides are employed, since it has been discovered that a marked synergistic effect, so far as the curing activity is concerned, of certain correlations betwen various types of peroxides is achieved; so much so that it has now been found possible to effect an ambient temperature cure of resinifiable mixes containing monovinyl aromatic monomers and polyolefinic monomeric compounds.

It has now been found that at least three peroxides should simultaneously be present in the resinifiable mix and that at least one of these three peroxides should be of the ketone or aldehyde type and at least two of these peroxides should be of the acyl peroxide type such as caprylyl peroxide, lauroyl peroxide, decanoyl peroxide, benzoyl peroxide, p-chloro benzoyl peroxide, 2,4-dichloro benzoyl peroxide, and acetyl peroxide. More than one ketone or aldehyde type peroxide may be employed and more than one of the acyl peroxides may be employed, provided at least one of the acyl peroxides is one of the last four peroxides specifically mentioned above.

A particular and preferred synergistic combination of peroxides employed consists of a mixture of 2,4-dichloro benzoyl peroxide, lauroyl peroxide, benzoyl peroxide, and methyl ethyl ketone peroxide. Other especially suitable combinations of peroxides consist of mixtures of 2,4-dichloro benzoyl peroxide, lauroyl peroxide, and methyl ethyl ketone peroxide or lauroyl peroxide, benzoyl peroxide, and methyl ethyl ketone peroxide. Still another desirable mixture employed consists of caprylyl peroxide, 2,4-dichloro benzoyl peroxide, lauroyl peroxide and methyl ethyl ketone peroxide.

Additionally, it has been found desirable, though not essential, to incorporate into the plurality of peroxides a small amount of a perester type peroxide. The hydroperoxides have been found to be disadvantageous and to inhibit the synergistic effects of the aforementioned peroxides. This is also true of the alkyl or alkyl substituted aryl peroxides, such as di-t-butyl peroxide and dicumyl peroxide. In other words, the instant novel peroxide admixture is formed of the acyl peroxides, the ketone peroxides (or the aldehyde peroxides) and the perester peroxides, the latter type being optional though at times desirable to include in the peroxide admixture.

The monomeric polymerizable nuclear monovinyl aromatic compound may be any one or more of the following: styrene, vinyl toluene, dimethyl styrene, p-ethyl styrene, p-chloro styrene, or the other simple substituted styrenes as well as vinyl naphthalene and isopropenyl benzene. They are usually present and constitute from about 80 to 95 wt. percent of the normally liquid resinifiable mix, exclusive of any fillers or reinforcing fibrous elements.

Additionally, a suitable crosslinking agent, which is of the polymerizable polyolefinic type, is employed. This may be any of the conventionally employed compounds, for example, any one or more of the following: diallyl fumarate, divinyl benzene, trivinyl benzene, diallyl itaconate, allyl acrylate, glycol diacrylate, ethylene glycol dimethacrylate, polyethylene glycol dimethacrylate, butylene glycol dimethacrylate, trimethylol propane trimethacrylate, propane triol trimethacrylate, diethyl fumarate, diisopropenyl benzene, and the like. Acrylonitrile may be used in admixture with these dienes.

The acyl peroxides which have been found to be useful in practicing the present invention are the following specific peroxides: 2,4-dichloro benzoyl peroxide, decanoyl peroxide, caprylyl peroxide, lauroyl peroxide, acetyl peroxide, benzoyl peroxide and p-chloro benzoyl peroxide. As before stated, at least one of the aforementioned peroxides other than decanoyl, lauroyl and caprylyl peroxides is required, although two or more of these form peroxides may be employed. If one of the four specific peroxides are employed, one, two, or all of the other three peroxides may likewise be employed.

Additionally, at least one of the ketone or aldehyde type peroxides are required in order to achieve satisfactory cures of the resinifiable mix at ambient temperatures, i.e., without the application of external heat. It is recognized, of course, that in the reacting of these resinifiable mixes, an exothermic reaction takes place, and as will be discussed hereinafter, the exothermic heat of reaction, coupled with the aforementioned specific selection of the various peroxides aids in the ambient temperature cure of the thermosetting mix. Of the ketone and aldehyde peroxides, one or more of the following is incorporated into the resinifiable mix simultaneously with the incorporation of one or more of the required acyl peroxides. Specific representative examples of these types of peroxides which are employed are the following: hydroxylheptyl peroxide (aldehyde type), bis (1-hydroxy cyclohexyl) peroxide (ketone type), methyl ethyl ketone peroxide (ketone type), and cyclohexanone peroxide (a ketone type).

Additionally, if desired, one or more of the peresters may be incorporated into the mixture of peroxides and resinifiable mix. Typical peresters which may be employed are as follows: diethyl peroxydicarbonate, diisopropyl peroxydicarbonate, dibenzyl peroxydicarbonate, t-butyl peroxyisobutynate, t-butyl peracetate, di-t-butyl diperoxy phthalate, and t-butyl perbenzonate. The use of these peresters, however, has not been found to be essential, although excellent gelling times and curing times are attainable at ambient temperatures, provided the requisite acyl peroxides and one or more of the ketone or aldehyde peroxides are also present.

The successful curing of the monovinyl-monomer-polyolefin-monomer polymerizable mixes without the application of external heat is successfully accomplished because it has been discovered that certain peroxides at room or atmospheric temperatures readily act as initiators of polymerization, while other peroxides require at least slightly elevated temperatures to initiate their catalytic polymerization effects. Similarly, it has now been discovered that the length of catalytic activity of the various peroxides varies to a considerable extent and that whereas a particular peroxide may readily initiate a polymerization at ambient temperature but is of short duration in its total activity, other peroxides do not readily initiate polymerization reaction at these temperatures but their activities are "set off" by the presence of the first mentioned peroxide initiators. The activity of these second mentioned type of peroxides usually ranges over a longer span of the total reaction. It has also been discovered that the overall catalytic effect of the proper mixture of these various types of peroxides results ultimately in a more complete cure at ambient temperatures than can be achieved through the use of any of the individual peroxide components of the admixture. It has thus been found desirable to employ a plurality of peroxides, selecting them in the manner above disclosed. Any one of the four specifically mentioned acyl peroxides has been found to act as a primary initiator of the polymerization reaction and it is thus necessary that at least one initiator type peroxide be present. These are of the acyl peroxide type, although not all acyl peroxides readily act as initiators of room temperature polymerization reactions. The presence of the decanoyl, lauroyl or caproyl peroxides markedly influences, synergistically, the catalytic effect of one of the other four mentioned acyl peroxides so much so that it is possible, through the use of the multiperoxide mixtures herein defined, to set up or harden, i.e., cure the resinifiable mixes without the application of external heat in only about 12 to 14 hours with the time required to secure the gel stage being as low as 40 to 75 minutes. Such curing times and gel times, of course, have been found using optimum amounts of each peroxides in the admixture and have also included the incorporation of certain reaction modifiers in the polymerizable mix.

Between about 2 and about 6 wt. percent of total peroxides based on the weight of the resinifiable mix are incorporated into the mix, and preferably between about 3.5 and about 5 wt. percent, but the total of the acyl peroxides should constitute, for best results, at least 50 wt. percent of all of the peroxides added.

It has been found necessary, while employing the plurality of peroxides heretofore mentioned, to also incorporate certain reaction modifiers, i.e., promoters and accelerators in the polymerizable mix. Particularly by reason of the use of acyl peroxides, it has been found desirable, in carrying out ambient temperature cures, to use in the mix at least one tertiary amine. Typical amines which can be successfully used are the N,N-dialkyl amino benzenes, and their simple homologs such as N,N-dimethyl aniline, N,N-diethyl aniline, N,N-dimethyl-p-toluidine, N-phenylmorpholine. Since at least one aldehyde or ketone peroxide is also necessarily incorporated in the mix, it has also been found necessary to incorporate into the mix a metal drier, such as cobalt naphthenate, zinc naphthenate, or lead naphthenate, or the cobalt complex of octyl aceto acetate. Such metal driers are conventionally used in peroxide cures of resinifiable mixes and they are likewise employed in the instant invention.

The promoters and accelerators for the catalysts should constitute between about 0.5 and about 3 wt. percent of the resinifiable mix, preferably between about 0.5 and about 1.5 wt. percent.

Certain other components of the monovinyl aromatic compound-polyolefin-monomeric compound mix have also been found to be useful for achieving the quickest curing time, but with satisfactory pot life, i.e., time prior to gellation. These are employed to improve the overall storage, handling, workability, and lay-up properties of the polymerizable mix. For example, from 0 to less than 10 wt. percent (all percentages used in this specification, unless otherwise stated, are based on the resinifiable mix and are exclusive of fillers or fibrous reinforcing agents) of an unsaturated polyester may be incorporated into the resinifiable mix in order to accelerate polymerization and to thus shorten the time required for complete reaction. The unsaturated polyesters may be any one or more of those commercially available to the trade. For example, the butylene-glycol condensation product with phthalic acid or phthalic anhydride admixed with maleic acid or maleic anhydride is a suitable ester for use in the present invention. Likewise, a styrene modified ethylene glycol or propylene glycol condensation product of the same mixtures of acids or acid anhydrides may be employed. In fact, any of the conventionally marketed unsaturated polyesters may be employed as one of the components of the mix. Additionally, it has been discovered that viscosity control is an important consideration in handling the lay-up and in speeding up the curing time of ambient temperature cure, so that thickening agents, when used in amounts ranging from 0 up to 10 wt. percent of the resinifiable mix, have been found to accelerate the curing time without adversely affecting the pot life, i.e., the time after mixing and before gellation. Suitable elastomers and unsaturated reactible polymers and copolymers such as natural rubber in the form of pale crepe, preferably broken pale crepe, polyisoprene, GR–S (butadiene emulsion copolymerized with a minor amount of styrene), polybutadiene, rubbery ethylene-propylene copolymers, and the normally liquid butadiene-styrene copolymer or normally liquid polybutadiene obtained by polymerizing the respective monomer or monomers with the aid of an alkali metal such as sodium, are suitable for incorporation in the resinifiable mix to give a relatively viscous mix for use of lay-up and impregnation of reinforcing elements such as fiberglass cloth or mat prior to gellation.

Additionally, it has been discovered that a marked shortening of the curing time, at ambient temperatures, without sacrificing desirable high viscosity properties of the resinifiable mix, is achieved through the use of from 0 up to about 30.0 wt. percent of acrylonitrile. Even 1 or 2 wt. percent of acrylonitrile materally shortens the required curing time.

The present novel resinifiable mix, which has been found to be successfully curable at ambient temperatures and without the application of external heat, finds its greatest usefulness in the fabrication of large objects such as boat hulls, large structural panels, pipe of unusual length and size, where hand lay-up techniques are required and where, because of the large size of the object, it is not practical to cure the object through the use of molds or ovens or other apparatus for heating or baking with or without the use of superatmospheric pressures. For this reason, the invention finds its greatest utility in the association or impregnation of the novel resinifiable mix with or into fillers or reinforcing elements. It is therefore a preferred embodiment of the present invention to commingle such fillers or fibers with the normally liquid resinifiable mix containing the novel combination of various heretofore described peroxides as curing agents.

The reinforcing elements that are suitable for use in connection with the novel resinifiable mix are such materials as fiber glass, asbestos, mica, cotton, linen, rayon, orlon and the like and filler materials such as finely divided quartz or silica, celite, diatomaceous silica, glass, and the like. A preferred material among the fibers is glass fiber and includes filament yarns, rovings, staple yarns, ground and chopped fibers. Particularly, in the case of glass fibers and finely divided quartz or silica, the fibers or particles should either be pretreated with an unsaturated silane or a silane ester should be added to the polymerizable mix. A pretreatment of the siliceous materials with a silane as well as optionally using a small amount of the silane added directly to the mix is desirable in order to get good bonding between the reinforcing elements and the resinifiable mix. From between about 0.1 and about 3 wt. percent of silane ester is incorporated in the mix. This ester has the following general formula: $R_nSi(OR_1)_{4-n}$, wherein R is an unsaturated hydrocarbon (alkenyl) group, e.g., vinyl, allyl, methallyl, styryl, or crotyl group and the like; $n$ is a positive integer equal to 1, 2, or 3; and $R_1$ is an alkoxy or aroxy group or substituted derivatives thereof. There is some evidence to indicate that these silanes react with the hydroxyl groups of the moisture contained on the surface of the glass fibers. Previously, partially hydrolyzed silanes (contacted with less than the required stoichiometric amount of water) have been used to treat the glass or may be added to the resinifiable mix. The alkenyl group, such as the vinyl group of the silane is believed to be readily reactable with the polymerizable components of the resin mix during the curing step, thus effectively bonding the reinforcing elements to the cured resin. Between about 5 and about 90 wt. percent, preferably between about 20 and about 80 wt. percent of the fine particle filler, based on the total resinifiable mix, may be commingled or otherwise admixed or impregnated with the resinifiable mix. Glass fibers or other fibrous material employed as the reinforcing elements, particularly in the preparation of multi-plied cloth laminates, will generally constitute between about 25 and about 300 by weight, based on the mix, in the final laminate. Typical laminates have been prepared, as indicated in the following examples, using 3 plies of a glass fiber material such as glass mat and using 12 plies of glass cloth. The resin mix is combined, in the case of using finely divided fillers, by the use of suitable mechanical agitation means, such as pug mills, rubber mills, Banbury mixers, or kneaders. The glass cloth or other fibrous cloth may be impregnated with the mix by brush impregnation, pouring it into the center of the cloth, by dipping the cloth in a bath of the mix or in any other suitable manner, always insuring that there is good wetting of the mix with the cloth fibers. Fibers can also be either in the form of cloth or as individual strand rovings, and can be dipped in the mix and wound about a steel mandrel, at an angle to the axis of the mandrel circumferentially in superimposed layers to form a peripheral shell of a pipe, after the manner described in U.S. Patent 2,714,414. Such pipe is then allowed to cure at ambient temperature.

Although it is not absolutely necessary, for best curing results, where practical, it has been discovered that during the ambient temperature curing operation, oxygen and/or air should be excluded from contact with the resinifiable mix, and that either a vacuum or a nitrogen atmosphere or even a thin coating of an impermeable sheet or membrane of a synthetic polymeric material, such as Mylar, may be applied to the work while it cures. The contacting of the work, during curing, with oxygen definitely inhibits the cure and does so to such an extent that the work may not, in some few cases, set up to a completely cured resinous state. Additionally, and if possible from a practical standpoint, it is desirable but not essential to have a positive pressure exerted on the work, as by using an open faced pressure mold, having a superatmospheric pressure up to 700 or 1000 p.s.i., in direct contact with the workpiece or in contact with a sheet or film laid across the workpiece. This not only aids in excluding oxygen from the work during cure, but also it has been found to lower monomer loses, particularly in cases where styrene or vinyl toluene constitutes the major portion of the polymerizable mix or when lower boiling materials are present.

Although it is unnecessary in securing final cured reinforced resinous compositions of excellent physical properties, it has been discovered that the physical strength properties of the final cured compositions are often times improved if, after the initial curing operation at atmospheric temperatures, the work is subjected to a post cure at moderately elevated temperatures, i.e., of the order of 200 to 400° F. for periods of time ranging between about 30 minutes and about 90 minutes. Preferably post curing operations, if used, are carried out for about 1 hour at temperatures ranging between about 250° and about 300° F.

By the incorporation of a plurality of peroxides of the type and in the amounts heretofore specified, the time required for gelling, although fast enough, is not so fast that the resin system cannot be handled in a satisfactory manner for preparing reinforced resinous compositions. The completeness of the cure is to some extent a function of time but fast gelling times alone do not provide a satisfactory criterion for the production of an ambient, fully cured, final resinous composition.

The following examples are illustrative of the invention herein set forth, but it is not intended that the invention be construed as being limited to the examples so set forth, since they are solely illustrative in character. All initial cures were undertaken without the application of external heat.

In all of the following examples set forth in the tables, the parts shown are by weight, and in the case of the various peroxides employed, the parts shown are of the amount of the commercial material employed regardless of the amount of peroxide which was contained therein. For example, the lauroyl peroxide was employed as a 95% active component. 2,4-dichloro benzoyl peroxide was employed as a 50% solution in dibutyl phthalate. Methyl ethyl ketone peroxide was in dimethyl phthalate as a 60% active component and was a mixture of isomers. Cyclohexanone peroxide was used as an 85% active component in dibutyl phthalate and benzoyl peroxide was used as a 96% active powder. Caprylyl peroxide was use in the form of a 50% active component in mineral oil. N-phenylmorpholine and the alkyl anilines used were C.P. grade chemicals. The Co-acetoacetate $C_8$ ester was a cobalt complex with acetoacetate octyl ester and contained 5.47% of cobalt. The cobalt naphthenate had a cobalt content of 6% and the lead content of the lead naphthenate was 24%.

The flexural strength tests were carried out using ASTM No. D-790-59T, using standard test specimens of the following dimensions: 3" x 1.0" x 0.125". The tensile strength measurements were carried out using the standard ASTM test method No. D-638-58T. The Barcol hardness test was carried out using a conventional Barcol hardness tester. Barcol hardness, as shown in the following tables, was determined at the time the fluxural strength tests were carried out on the specimens. Where glass cloth is indicated as having been used, it was used to the extent of 12 plies and the fibers therein contained 181 vinyl silane finish. The glass cloth constituted from 47 to 48% by weight of the total weight of the final laminate. Flexural strengths and tensile strengths measured after post curing reflected a post cure, carried out for 1 hours on the test specimens at temperatures of 250° to 270° F. The boiling water test, the flexural strength and tensile strength readings were made on specimens which had been cured at ambient temperatures and then subjected for 7 continuous days to boiling water, after which the flexural and tensile strengths were measured. In some instances the pale crepe rubber used was actually added as a 20% solution in styrene, but the figures in the tables represent the parts by weight of pale crepe rubber used. The Supersil 270 was a finely divided silica powder, whose particles had an average diameter of about 6.0 microns.

TABLE I

| | Example No. | | | | | | | | |
|---|---|---|---|---|---|---|---|---|---|
| | 1 | 2 | 3 | 4 | 5 | 6 | 7 | 8 | 9 |
| Styrene | 85.7 | 26.6 | 190.0 | 23.8 | 164.9 | 186.0 | 100.0 | 100.0 | 100.0 |
| Unsaturated polyester [1] | 6.0 | | | | [2] 12.0 | | | | |
| Diethyl fumarate | | 2.0 | | 3.0 | | 14.0 | | | |
| Butylene glycol dimethacrylate | 3.3 | | | | 3.6 | | | | |
| Trimethylol propane trimethacrylate | | 1.4 | 10.0 | | | 10.0 | | | |
| Ethylene glycol dimethacrylate | | | | 1.2 | | | 6.0 | 6.0 | 6.0 |
| Pale crepe rubber | 6.0 | | | | 1.5 | | | 10.0 | 15.0 |
| Acyl peroxides: | | | | | | | | | |
| Lauroyl | 2.0 | 0.3 | 3.0 | 0.2 | | 2.1 | 0.5 | 0.5 | 0.5 |
| Caprylyl | 0.5 | 0.5 | | | | 3.0 | | | |
| 2,4-dichlorobenzoyl | | 0.2 | 2.0 | | 3.5 | | 0.75 | 0.75 | 0.75 |
| Benzoyl | 1.0 | | | 0.8 | 1.5 | 1.0 | 1.5 | 1.5 | 1.5 |
| Ketone or aldehyde peroxides, methyl ethyl ketone | 0.5 | 0.1 | 1.0 | 0.1 | 1.5 | 0.7 | 0.75 | 0.75 | 0.75 |
| Vinyl tri-2-methoxy-ethoxy silane | 1.0 | | | | 2.5 | 1.5 | 0.1 | 0.1 | 0.1 |
| Glass cloth | | | ([3]) | | | | ([3]) | ([3]) | ([3]) |
| Supersil 270 | 322.0 | | | | 576.9 | 675.0 | | | |
| N-phenyl morpholine | 1.0 | | 4.0 | 0.8 | 1.5 | | | | |
| N,N-dimethyl aniline | | 0.8 | | [6] 0.1 | | 2.5 | 0.5 | | |
| Co-naphthenate | 0.2 | | | | | | 0.5 | | |
| Co-acetoacetate $C_8$ ester | | 0.3 | 0.2 | 0.1 | 0.8 | 1.8 | | | |
| Pb-naphthenate | | 0.1 | | 0.1 | | 0.7 | | | |
| Physical properties: | | | | | | | | | |
| Hardening time, hrs | 75 | 25.0 | 42 | 21.0 | 72.0 | 48 | >27.5 | 17.5 | <14.5 |
| A. Flexural strength, p.s.i | 5,000 | | 47,500 | | 7,900 | 4,000 | 38,200 | 37,400 | 26,600 |
| B. Tensile strength, p.s.i | 2,550 | | 37,425 | | 4,470 | 2,900 | | | |
| C. Barcol hardness, p.s.i | 35 | | 28 | | 40 | 25 | 42 | 35 | 38 |
| D. Flexural strength, p.s.i.[4] | 7,600 | | 51,725 | | 9,200 | 5,640 | 45,800 | 41,700 | 37,300 |
| E. Tensile strength, p.s.i.[4] | 3,700 | | 37,790 | | 5,000 | 2,800 | | | |
| F. Flexural trength, p.s.i.[5] | 4,800 | | 56,300 | | 9,200 | 4,300 | | | |
| G. Tensile strength, p.s.i.[5] | 3,700 | | 32,400 | | 4,260 | 2,300 | | | |

[1] Styrene modified polyol-phthalate-maleate ester visc. (Brookfield) 4.5 poises at 77° F.
[2] Butylene glycol phthalate-maleate ester.
[3] Laminates of alternate layers of resin with 181 silane finish, glass cloth (12 plies total), 47 wt. percent of glass cloth in final laminate.
[4] Test specimens were subjected to a post curing at 250°–270° F. for 1 hour.
[5] Test specimens from 5 were subjected to boiling water for 7 days and further tested.
[6] N,N-diethyl m-toluidine.

TABLE II

| | 12-plies-glass cloth laminates | | | | | | | | | | | | | |
|---|---|---|---|---|---|---|---|---|---|---|---|---|---|---|
| | Example No. | | | | | | | | | | | | | |
| | 10 | 11 | 12 | 13 | 14 | 15 | 16 | 17 | 18 | 19 | 20 | 21 | 22 | 23 |
| Styrene | 100.0 | 100.0 | 100.0 | 100.0 | 100.0 | 100.0 | 100.0 | 100.0 | 100.0 | 100.0 | 100.0 | 85.0 | 70.0 | 50.0 |
| Ethylene glycol dimethacrylate | 2.0 | 2.0 | 2.0 | 2.0 | 6.0 | 6.0 | 6.0 | 6.0 | 6.0 | 6.0 | 6.0 | 6.0 | 6.0 | 15.0 |
| Unsaturated polyester [1] | 5.0 | 5.0 | 5.0 | 5.0 | | | | | | | | | | |
| Pale crepe rubber | | | | 10.0 | 10.0 | 10.0 | 10.0 | 10.0 | 10.0 | 10.0 | 10.0 | | | |
| Acrylonitrile | 5.0 | 5.0 | 5.0 | 5.0 | | | | | | | 7.5 | | 15.0 | 30.0 | 50.0 |
| Vinyl trimethoxyethoxy silane | | | | | 0.1 | 0.1 | 0.1 | 0.1 | 0.1 | 0.1 | 0.1 | .25 | .25 | .25 |
| Acyl peroxides: | | | | | | | | | | | | | | |
| 2,4-dichlorobenzoyl | 0.8 | 1.6 | 1.6 | 1.6 | | | 1.0 | | | 0.75 | 0.75 | 0.75 | 0.75 | 0.75 |
| Lauroyl | 0.4 | | 0.4 | 0.4 | 0.5 | 1.25 | | 1.0 | | 0.5 | 0.5 | 0.5 | 0.5 | 0.5 |
| Benzoyl | 1.6 | 0.8 | | 0.8 | 2.25 | 1.5 | 2.5 | 2.75 | 1.5 | 1.5 | 1.5 | 1.5 | 1.5 | 1.5 |
| Ketone or aldehyde peroxide, methyl ethyl ketone | 0.2 | 0.2 | 0.2 | | 0.75 | 0.75 | | 1.0 | 0.75 | 0.75 | 0.75 | 0.75 | 0.75 | 0.75 |
| Dimethyl aniline | 1.0 | 1.0 | 1.0 | 1.0 | 0.5 | 0.5 | 1.0 | 1.0 | 0.5 | 0.5 | 0.5 | 0.5 | 0.5 | 0.5 |
| Co-naphthenate | 0.4 | 0.4 | 0.4 | 0.4 | 0.5 | 0.5 | | | 0.5 | 0.5 | 0.5 | 0.5 | 0.5 | 0.5 |
| Gel time, minutes | 35.0 | 28 | 56 | 49 | 130 | 205 | 90 | 125 | 140 | 40 | 115 | 23 | 21 | 15 |
| Time to harden, hrs | <18.0 | >20 | <28.5 | <28.5 | 22.5 | 24 | | 28 | >28 | 12 | 17.5 | 3.5 | 2 | 1 |
| Hardness (Barcol) | ([2]) | Good | Fair | Poor | 5 | 42 | Soft | 17 | 43 | 36 | 35 | 26 | 33 | Poor |
| Flexural strength, p.s.i | | | | | 43,100 | 41,000 | | 43,000 | | 32,600 | 37,400 | 22,400 | 24,300 | Poor |
| Post cure, 1 hr. at 270° F., flexural strength, p.s.i | | | | | 44,600 | 42,700 | | 44,900 | | 44,800 | 41,700 | | | |
| Hardness (Barcol) (after post cure) | | | | | 50 | 46 | | 49 | | 45 | 40 | | | |

[1] See footnote at end of Table I.
[2] Excellent.

The data contained in Table II differs from those data in Table I chiefly in that Table II shows the comparative data on test specimens of laminates in which varying amounts of acrylonitrile and/or a vinyl silane are components of the resinifiable mix and in which styrene and ethylene glycol dimethacrylate are the chief components. Excluding those examples showing the use of unsaturated polyester or acrylonitrile, the tables of data shows that a typical and optimum formulation of a successful resinifiable mix and ambient temperature cure is that shown in Example 20. The activating effect of acrylonitrile is shown by comparing the results of Example 20 with those of Examples 19, 21, 22 and 23. The greater the amount of acrylonitrile, the faster the cure rate. Omitting some of the peroxides and catalysts used in Example 20 or using lesser amounts of these substances yield laminates of poorer properties and/or the ambient temperature curing was at a much slower rate. Examples 13 and 16 which omitted the use of methyl ethyl ketone peroxide did not produce a laminate that cured to a satisfactory hardness at all. In Example 16 the sample did not harden in spite of the use of a large amount of benzoyl peroxide. The specimens prepared in accordance with Example 18 finally cured but required an excessively long period of time to do so. Example 16 really illustrates, in a negative manner, the necessity of simultaneously using at least three of the peroxides in accordance with the teachings of the heretofore described invention because the absence of the ketone peroxide resulted in a soft (uncured) laminate.

The novel reinforced laminates and filled compositions of this invention find particular use in fabricating structural panels, automobile bodies, boat hulls, aircraft pipes, ducts in heat shields and nose cones of missiles, tanks, containers, trays, industrial housings, and electrical applications and appliances.

Having now thus fully described and illustrated the character of the invention, what is desired to be secured by Letters Patent is:

1. A process for curing at room temperature without the application of external heat, a monomeric mononuclear, monovinyl aromatic compound which comprises admixing a major portion of the monomeric mononuclear compound with a minor amount of a polymerizable polyethylenically unsaturated monomeric crosslinking agent selected from the group consisting of diallyl fumarate, divinyl benzene, trivinyl benzene, diallyl itaconate, allyl acrylate, glycol diacrylate, ethylene glycol dimethacrylate, polyethylene glycol dimethacrylate, butylene glycol dimethacrylate, trimethylol propane trimethacrylate, propane triol trimethacrylate, diethyl fumarate, diisopropenyl benzene and mixtures thereof, about 2 to about 6 wt. percent of a mixture of at least three peroxides, at least one of which is of the ketone-aldehyde type, at least two of which are acyl peroxides of which at least one is selected from the group consisting of benzoyl peroxide, p-chloro benzoyl peroxide, 2,4-dichloro benzoyl peroxide and acetyl peroxide, wherein the acyl peroxides constitute at least 50 wt. percent of the peroxides added, about 0 to 10 wt. percent of an elastomeric viscosity thickener, a monomeric drier selected from the group consisting of (1) metal naphthenates and (2) the cobalt complex of alkyl acetoacetate and a tertiary amine.

2. A process as in claim 1 wherein the resinifiable composition contains an unsaturated polyester in an amount of less than 10% by weight.

3. A process as in claim 1 wherein the resinifiable composition contains acrylonitrile in an amount ranging between 0 and about 10.0 wt. percent.

4. A process as in claim 1 wherein the resinifiable composition contains reinforcing elements in association therewith.

5. A process as in claim 4 wherein the reinforcing elements are glass fibers and wherein the monomeric mix contains a vinyl silane bonding agent.

6. A process as in claim 1 wherein the reinforcing elements are finely divided silica particles and the resinifiable composition contains a vinyl silane bonding agent.

7. A process as in claim 1 wherein the mixture of peroxides comprises 2,4-dichloro benzoyl peroxide, lauroyl peroxide and methyl ethyl ketone peroxide.

8. A process as in claim 1 wherein the peroxide mixture comprises 2,4-dichloro benzoyl peroxide, benozyl peroxide, lauroyl peroxide and methyl ethyl ketone peroxide.

9. A process as in claim 1 wherein the mixture of peroxides comprises 2,4-dichloro benzoyl peroxide, lauroyl peroxide, caprylyl peroxide and methyl ethyl ketone peroxide.

10. A process for preparing a resinous composition comprising a plurality of layers of fibrous reinforcing elements which comprises preparing a plurality of layers of fibrous reinforcing elements in association with a resinifiable mix composed of a major portion of a monomeric mononuclear, monovinyl aromatic compound, a minor amount of a polymerizable polyethylenically unsaturated monomeric crosslinking agent selected from the group consisting essentially of diallyl fumarate, divinyl benzene, trivinyl benzene, diallyl itaconate, allyl acrylate, glycol diacrylate, ethylene glycol dimethacrylate, polyethylene glycol dimethacrylate, butylene glycol dimethacrylate, trimethylol propane trimethacrylate, propane triol trimethacrylate, diethyl fumarate, diisopropenyl benzene, and mixtures thereof, and curing said resinifiable mix with a mixture of at least three peroxides, at least one of which is of the ketone-aldehyde type, at least two of which are acyl peroxides, of which at least one is selected from the group consisting of benzoyl peroxide, p-chloro benzoyl peroxide, 2,4-dichloro benzoyl peroxide and acetyl peroxide, a monomeric drier selected from the group consisting of (1) metal naphthenates and (2) the cobalt complex of alkyl acetoacetate and a tertiary amine; said laminate having been cured at ambient temperatures and without the application of external heat.

11. The process as in claim 10 in which the plurality of layers of fibrous material is glass cloth.

12. A process for preparing a resinous composition comprising a major portion of finely divided mineral filler which comprises admixing a finely divided mineral filler with a resinifiable mix composed of a major portion of a monomeric mononuclear, monovinyl aromatic compound, a minor amount of a polymerizable polyethylenically unsaturated monomeric crosslinking agent selected from the group consisting essentially of diallyl fumarate, divinyl benzene, trivinyl benzene, diallyl itaconate, allyl acrylate, glycol diacrylate, ethylene glycol dimethacrylate, polyethylene glycol dimethacrylate, butylene glycol dimethacrylate, trimethylol propane trimethacrylate, propane triol trimethacrylate, diethyl fumarate, diisopropenyl benzene and mixtures thereof, and curing said resinifiable mix with a mixture of at least three peroxides, at least one of which is of the ketone-aldehyde type, at least two of which are acyl peroxides, of which at least one is selected from the group consisting of benzoyl peroxide, p-chloro benzoyl peroxide, 2,4-dichloro benzoyl peroxide and acetyl peroxide, a monomeric drier selected from the group consisting of metal naphthenates and the cobalt complex of alkyl acetoacetate and a tertiary amine, the resultant filled composition having been cured at ambient temperatures and without the application of external heat.

13. The process as in claim 12 in which the finely divided filler is finely divided silica.

14. A process for curing normally liquid resinifiable composition at ambient temperatures wherein said resinifiable mix comprises:

(1) a major portion of a monomeric mononuclear, monovinyl aromatic compound;

(2) a minor amount of a polymerizable polyethylenic unsaturated monomeric crosslinking agent selected from the group consisting essentially of diallyl fumarate, divinyl benzene, trivinyl benzene, diallyl itaconate, allyl acrylate, glycol diacrylate, ethylene glycol dimethacrylate, polyethylene glycol dimethacrylate, butylene glycol dimethacrylate, trimethylol propane trimethacrylate, propane triol trimethacrylate, diethyl fumarate, diisopropenyl benzene;

using as a curative (3) a mixture of at least three peroxides of which
   (a) at least one peroxide is an aldehyde type or ketone type peroxide, and
   (b) at least two peroxides are acyl peroxides of which at least one acyl peroxide is benzoyl peroxide, p-chlorobenzoyl peroxide, 2,4-dichloro benzoyl peroxide, or acetyl peroxide and at least one acyl peroxide is decanoyl peroxide, laurol peroxide or caproyl peroxide; and (4) a monomeric dried selected from the group consisting of metal naphthenates, the cobalt complex of an alkyl acetoacetate, a tertiary amine and mixtures thereof.

15. The process of claim 14 which contains about 0 to about 10 wt. percent, based on the resinifiable composition, of an unsaturated, reactable material selected from the group consisting of natural rubber, polyisoprene, rubbery polybutadiene, rubbery ethylene-propylene copolymers, normally liquid butadiene and normally liquid butadiene-styrene copolymers.

16. The process of claim 14 wherein the mixture of peroxides comprises 2,4-dichloro benzoyl peroxide, lauroyl peroxide and methyl ethyl ketone peroxide.

17. The process of claim 14 wherein the mixture of peroxides comprises 2,4-dichloro benzoyl peroxide, benzoyl peroxide, lauroyl peroxide and methyl ethyl ketone peroxide.

18. The process of claim 14 wherein the mixture of peroxides comprises 2,4-dichloro benzoyl peroxide, lauroyl peroxide, caproyl peroxide and methyl ethyl ketone peroxide.

19. The process of claim 14 wherein the composition contains unsaturated polyester in an amount of less than 10 wt. percent.

20. The process of claim 14 which contains about 0 to about 10 wt. percent, based on the resinifiable composition, of acrylonitrile.

21. The process as in claim 14 wherein reinforcing elements are in association therewith.

22. The process as in claim 21 wherein the reinforcing elements are glass fibers and wherein the monomeric mix contains a vinyl silane bonding agent.

23. The process as in claim 22 wherein the reinforcing elements are finely divided silica particles and the resinifiable composition contains a vinyl silane bonding agent.

24. A process for curing normally liquid resinifiable composition at ambient temperatures wherein said resinifiable composition comprises:

(1) a major portion of a monomeric mononuclear, monovinyl aromatic compound;

(2) a minor amount of a polymerizable polyethylenic unsaturated monomeric crosslinking agent selected from the group consisting essentially of diallyl fumarate, divinyl benzene, trivinyl benzene, diallyl itaconate, allyl acrylate, glycol diacrylate, ethylene glycol dimethacrylate, polyethylene glycol dimethacrylate, butylene glycol dimethacrylate, trimethylol propane trimethacrylate, propane triol trimethacrylate, diethyl fumarate, diisopropenyl benzene;

using as a curative (3) an unsaturated reactable polymeric viscosity thickener selected from the group consisting of natural rubber, polyisoprene, rubbery ethylene-propylene copolymers, normally liquid polybutadiene and normally liquid butadiene-styrene copolymers;

(4) a monomeric drier selected from the group consisting of metal naphthenates the cobalt complex of an alkyl acetoacetate, a tertiary amine and mixtures thereof.

25. The process of claim 24 wherein the mixture of peroxides comprises 2,4-dichloro benzoyl peroxide, laurolyl peroxide and methyl ethyl ketone peroxide.

26. The process of claim 24 wherein the mixture of peroxides comprises 2,4-dichloro benzoyl peroxide, benzoyl peroxide, lauroryl peroxide, and methyl ethyl ketone peroxide.

27. The process of claim 24 wherein the mixture of peroxides comprises 2,4-dichloro benzoyl peroxide, lauroyl peroxide, caproyl peroxide and methyl ethyl ketone peroxide.

28. The process of claim 24 wherein the composition contains unsaturated polyester in an amount of less than 10 wt. percent.

29. The process as in claim 24 which contains about 0 to about 10 wt. percent, based on the resinifiable composition, of acrylonitrile.

30. The process as in claim 24 wherein reinforcing elements are in association therewith.

31. The process as in claim 30 wherein the reinforcing elements are glass fibers and wherein the monomeric mix contains a vinyl silane bonding agent.

32. The process as in claim 30 wherein the reinforcing elements are finely divided silica particles and the resinifiable composition contains a vinyl silane bonding agent.

References Cited

UNITED STATES PATENTS

| | | | |
|---|---|---|---|
| 3,135,723 | 6/1964 | Vandegaer | 260—86.7 |
| 2,978,395 | 4/1961 | Holliday et al. | 260—86.7 |
| 2,912,418 | 11/1959 | Johnson et al. | 260—86.7 |
| 2,366,517 | 1/1945 | Gleason | 260—86.7 |
| 2,137,393 | 11/1938 | Dorough et al. | 260—86.7 |
| 3,222,327 | 12/1965 | Guillet et al. | 260—93.5 |
| 3,357,964 | 12/1967 | Gülden et al. | 260—93.5 |

MORRIS LIEBMAN, Primary Examiner

R. BARON, Assistant Examiner

U.S. Cl. X.R.

260—41, 41.5, 85.5, 86.7